US008769947B2

(12) United States Patent
Alexander et al.

(10) Patent No.: US 8,769,947 B2
(45) Date of Patent: *Jul. 8, 2014

(54) EXHAUST SYSTEM

(75) Inventors: Paul W. Alexander, Ypsilanti, MI (US); Alan L. Browne, Grosse Pointe, MI (US); Nancy L. Johnson, Northville, MI (US); Patrick B. Usoro, Troy, MI (US); Nilesh D. Mankame, Ann Arbor, MI (US); Xiujie Gao, Troy, MI (US); Geoffrey P. Mc Knight, Los Angeles, CA (US); Marten Wittorf, Ingelheim (DE); John A. Cafeo, Farmington, MI (US); Christopher P. Henry, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 726 days.

This patent is subject to a terminal disclaimer.

(21) Appl. No.: 12/947,927

(22) Filed: Nov. 17, 2010

(65) Prior Publication Data

US 2011/0120118 A1      May 26, 2011

Related U.S. Application Data

(60) Provisional application No. 61/263,308, filed on Nov. 20, 2009.

(51) Int. Cl.
*F01B 29/10* (2006.01)
*F02G 1/04* (2006.01)

(52) U.S. Cl.
USPC ................... 60/527; 60/528; 60/529; 60/616; 60/618; 60/620

(58) Field of Classification Search
USPC ............................ 60/527–529, 616, 618, 620
See application file for complete search history.

(56) References Cited

U.S. PATENT DOCUMENTS

| 3,772,876 | A | * | 11/1973 | Slysh | 60/529 |
|---|---|---|---|---|---|
| 4,041,706 | A | * | 8/1977 | White | 60/527 |
| 4,055,955 | A | | 11/1977 | Johnson | |
| 4,087,971 | A | * | 5/1978 | Hart | 60/527 |
| 4,150,544 | A | | 4/1979 | Pachter | |
| 4,275,561 | A | * | 6/1981 | Wang | 60/527 |
| 4,938,026 | A | * | 7/1990 | Goldstein | 60/527 |
| 5,279,123 | A | | 1/1994 | Wechsler et al. | |

(Continued)

FOREIGN PATENT DOCUMENTS

DE     102007006146 A1     8/2008

*Primary Examiner* — Kenneth Bomberg
*Assistant Examiner* — Daniel Wagnitz
(74) *Attorney, Agent, or Firm* — Quinn Law Group, PLLC (57) ABSTRACT

An exhaust system configured for converting thermal energy to mechanical energy includes a source of thermal energy provided by a temperature difference between an exhaust gas having a first temperature and a heat sink having a second temperature that is lower than the first temperature. The exhaust system also includes a conduit configured for conveying the exhaust gas, a heat engine disposed in thermal relationship with the conduit and configured for converting thermal energy to mechanical energy, and a member disposed in contact with the conduit and configured for conducting thermal energy from the conduit to the heat engine. The heat engine includes a first element formed from a first shape memory alloy having a crystallographic phase changeable between austenite and martensite at a first transformation temperature in response to the temperature difference between the exhaust gas and the heat sink.

14 Claims, 4 Drawing Sheets

(56) References Cited

U.S. PATENT DOCUMENTS

| | | |
|---|---|---|
| 5,327,987 A | 7/1994 | Adbelmalek |
| 5,442,914 A * | 8/1995 | Otsuka .......................... 60/527 |
| 5,899,071 A * | 5/1999 | Stone et al. .................. 60/641.8 |
| 7,370,612 B2 * | 5/2008 | Hanai ........................ 123/41.14 |
| 7,469,540 B1 * | 12/2008 | Knapton et al. ................ 60/618 |
| 7,775,042 B1 * | 8/2010 | Tice ................................ 60/529 |
| 2009/0241537 A1 | 10/2009 | Browne et al. |

\* cited by examiner

EXHAUST SYSTEM

CROSS-REFERENCE TO RELATED APPLICATIONS

This application claims the benefit of U.S. Provisional Patent Application No. 61/263,308, filed Nov. 20, 2009, which is hereby incorporated by reference in its entirety.

TECHNICAL FIELD

The present disclosure generally relates to an exhaust system, and more specifically, to an exhaust system configured for converting thermal energy to mechanical energy.

BACKGROUND

Vehicles may be powered by an engine and/or one or more batteries. For example, the engine may provide motive power for the vehicle and/or charge the batteries. The batteries, in turn, may provide power for starting the engine, and/or may provide motive power for the vehicle.

Both engines and batteries may produce a large quantity of waste heat, i.e., excess thermal energy, and close to half of the waste heat is typically dissipated into the atmosphere as an exhaust stream. Despite improvements in engine and combustion technology, nearly one-quarter of fuel energy may be expelled as waste heat in the exhaust stream. Therefore, significant gains in vehicle fuel economy may be realized if waste heat is converted into usable mechanical and/or electrical energy.

SUMMARY

An exhaust system configured for converting thermal energy to mechanical energy includes a source of thermal energy provided by a temperature difference between an exhaust gas having a first temperature and a heat sink having a second temperature that is lower than the first temperature. The exhaust system also includes a conduit configured for conveying the exhaust gas, and a heat engine disposed in thermal relationship with the conduit. The heat engine is configured for converting thermal energy to mechanical energy and includes a first element formed from a first shape memory alloy having a crystallographic phase changeable between austenite and martensite at a first transformation temperature in response to the temperature difference between the exhaust gas and the heat sink. In addition, the exhaust system includes a member disposed in contact with the conduit and configured for conducting thermal energy from the conduit to the heat engine.

In one variation, the member includes a plurality of contacting objects configured for contacting the first element to thereby change crystallographic phase between austenite and martensite. Further, the exhaust system includes an insulator disposed in contact with the conduit and the member and configured for thermally insulating the conduit and the member. The exhaust system also includes a generator configured for converting mechanical energy to electricity, wherein the first shape memory alloy alternately dimensionally expands at a localized region in response to the second temperature and dimensionally contracts at another localized region in response to the first temperature to thereby convert thermal energy to mechanical energy and drive the generator.

In another variation, the exhaust system includes a plurality of conduits each configured for conveying the exhaust gas along an axis, a plurality of heat engines, and a plurality of members. Each of the plurality of heat engines includes a first element formed from the first shape memory alloy, and each of the plurality of elements is disposed within a respective one of the plurality of conduits. In addition, each of the plurality of members is disposed in contact with a respective one of the plurality of conduits and is configured for conducting thermal energy from the respective conduit to the respective heat engine.

The exhaust system provides excellent conversion of thermal energy to mechanical energy. That is, the exhaust system harvests thermal energy in the form of waste heat and produces mechanical output. Further, the heat engine is efficiently integratable into the exhaust system so as to maximize mechanical energy output.

The above features and advantages and other features and advantages of the present disclosure are readily apparent from the following detailed description of the best modes for carrying out the disclosure when taken in connection with the accompanying drawings.

DETAILED DESCRIPTION

Figure 1:
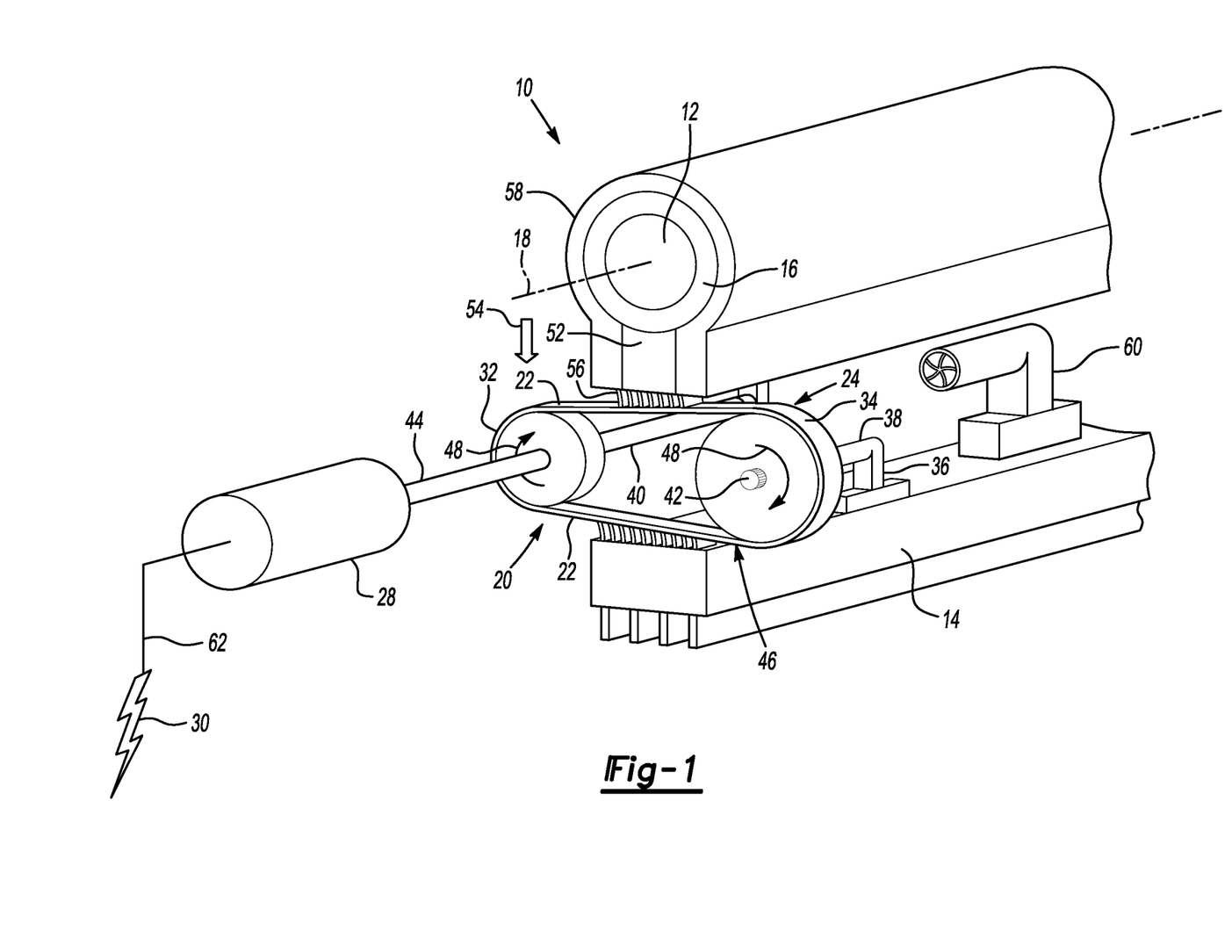
FIG. 1 is a schematic perspective view of an exhaust system including a heat engine.

Referring to the Figures, wherein like reference numerals refer to like elements, an exhaust system is shown generally at 10 in FIG. 1. The exhaust system 10 is configured for converting thermal energy to mechanical energy. Therefore, the exhaust system 10 may be useful for automotive applications including, but not limited to, vehicle exhaust systems, powertrain systems, and electrical systems. However, the exhaust system 10 may also be useful for non-automotive applications, such as, but not limited to, household heating, ventilating, and air conditioning systems. Based on the excellent conversion of thermal energy to mechanical energy, the exhaust system 10 may have other non-automotive applications, such as, but not limited to, applications utilizing battery coolant and household and geothermal waste heat. The exhaust system 10 may also directly drive mechanical devices including pumps and fans so as to bypass a mechanical-to-electrical energy conversion step and thereby minimize energy loss in a system.

Referring now to FIG. 1, the exhaust system 10 includes a source of thermal energy. The source of thermal energy is provided by a temperature difference, $\Delta T$, between an exhaust gas 12 having a first temperature, $T_1$, and a heat sink 14 having a second temperature, $T_2$, that is lower than the first temperature, $T_1$. That is, the first temperature, $T_1$, is higher and different than the second temperature, $T_2$. For example, the temperature difference, $\Delta T$, between the first temperature, $T_1$, and the second temperature, $T_2$, may be as little as about 5° C. and no more than about 100° C. Stated differently, the temperature difference, $\Delta T$, may be greater than or equal to about 5° C. and less than or equal to about 30° C., e.g., less than or equal to about 10° C. As non-limiting examples, although not shown, the temperature difference, $\Delta T$, may exist between or within catalytic converters, battery compartments, transmissions, wheels, brakes, shock absorbers, radiators, heat exchangers, mufflers, turbo/super chargers, plug-in units, and vehicle exteriors. That is, the temperature difference, $\Delta T$, may exist between or within engine lubrication systems, engine coolant systems, battery cooling systems, and the like.

The exhaust gas 12 may be, for example, thermal emissions or waste heat, i.e., excess thermal energy, from a vehicle (not shown). Alternatively, the exhaust gas 12 may be a thermal output of a battery (not shown), vehicle accessory (not shown), and/or vehicle component (not shown), such as an exhaust stream of a catalytic converter.

The heat sink 14, by comparison, may be selected from the group of gases, liquids, solids, and combinations thereof. For example, the heat sink 14 may also be a gas, such as a relatively cooler portion of exhaust emissions of the vehicle (not shown) or ambient air in an environment external to the vehicle. That is, the heat sink 14 may be the same composition as the exhaust gas 12 or may be a different composition than the exhaust gas 12. In one variation, the exhaust gas 12 and the heat sink 14 may each be exhaust emissions in the form of a gas from a vehicle, but the exhaust gas 12 may be upstream of the heat sink 14 and have the first temperature, $T_1$, that is higher than the second temperature, $T_2$. That is, as set forth above, the heat sink 14 may be gas that is downstream of and cooler than the exhaust gas 12. Or, the heat sink 14 may be an ambient environment external to the vehicle (not shown), such as a relatively cool air flow over the vehicle during vehicle travel. Alternatively, the heat sink 14 may have a different form or phase than the exhaust gas 12. For example, the heat sink 14 may be a liquid, such as water or coolant.

Referring again to FIG. 1, the exhaust system 10 also includes a conduit 16 configured for conveying the exhaust gas 12. For example, the conduit 16 may be a pipe or flexible tube that is configured for conveying the exhaust gas 12 along an axis 18. Although the conduit 16 may have any shape or configuration, in one variation, the conduit 16 may be a hollow cylindrical pipe configured for transferring the exhaust gas 12 from one vehicle component to another. For example, the conduit 16 may be an exhaust pipe of the vehicle, and may channel the exhaust gas 12, and accompanying waste heat, away from the vehicle engine (not shown) toward the heat sink 14, e.g., the atmosphere external to the vehicle (not shown).

With continued reference to FIG. 1, the exhaust system 10 also includes a heat engine 20. The heat engine 20 is configured for converting thermal energy, e.g., heat, to mechanical energy, as set forth in more detail below. More specifically, the heat engine 20 includes a first element 22 formed from a first shape memory alloy having a crystallographic phase changeable between austenite and martensite at a first transformation temperature, $T_{trans1}$, in response to the temperature difference, $\Delta T$, between the exhaust gas 12 and the heat sink 14. That is, the first shape memory alloy may have a specific transformation temperature, $T_{trans1}$, at which the first shape memory alloy transitions between crystallographic phases.

As used herein, the terminology "shape memory alloy" refers to alloys that exhibit a shape memory effect and have the capability to quickly change properties in terms of stiffness, spring rate, and/or form stability. That is, the first shape memory alloy may undergo a solid state crystallographic phase change via molecular or crystalline rearrangement to shift between a martensite phase, i.e., "martensite", and an austenite phase, i.e., "austenite". Stated differently, the first shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. In general, the martensite phase refers to the comparatively lower-temperature phase and is often more deformable than the comparatively higher-temperature austenite phase.

The temperature at which the first shape memory alloy begins to change from the austenite phase to the martensite phase is known as the martensite start temperature, $M_s$. The temperature at which the first shape memory alloy completes the change from the austenite phase to the martensite phase is known as the martensite finish temperature, $M_f$, or first transformation temperature, $T_{trans1}$. Similarly, as the first shape memory alloy is heated, the temperature at which the first shape memory alloy begins to change from the martensite phase to the austenite phase is known as the austenite start temperature, $A_s$. The temperature at which the first shape memory alloy completes the change from the martensite phase to the austenite phase is known as the austenite finish temperature, $A_f$, or first transformation temperature, $T_{trans1}$.

Therefore, the first element 22 formed from the first shape memory alloy may be characterized by a cold state, i.e., when a temperature of the first shape memory alloy is below the martensite finish temperature, $M_f$, or first transformation temperature, $T_{trans1}$, of the first shape memory alloy. Likewise, the first element 22 may also be characterized by a hot state, i.e., when the temperature of the first shape memory alloy is above the austenite finish temperature, $A_f$, or first transformation temperature, $T_{trans1}$, of the first shape memory alloy.

In operation, the first shape memory alloy that is pre-strained or subjected to tensile stress can change dimension upon changing crystallographic phase to thereby convert thermal energy to mechanical energy. That is, when exposed to the source of thermal energy, the first shape memory alloy can change dimension upon changing crystallographic phase to thereby convert thermal energy to mechanical energy. In particular, the first shape memory alloy may change crystallographic phase from martensite to austenite and thereby dimensionally contract at a localized region (represented generally at 24 in FIG. 1) in response to the exhaust gas 12 so as to convert thermal energy to mechanical energy. More specifically, the first shape memory alloy may dimensionally contract if the first shape memory alloy has been previously pre-strained pseudoplastically. The terminology "pre-strained pseudoplastically" refers to stretching, e.g., straining, the first element 22 under load while the first shape memory alloy is in the martensite phase. The shape of the first shape memory alloy under load does not fully recover when the first element 22 is unloaded. In contrast, a shape of the first element 22 when strained under purely elastic strain may fully recover. Therefore, upon unloading, the first element 22 formed from the first shape memory alloy appears to have plastically deformed, but when the first element 22 is heated to the austenite start temperature, $A_s$, the strained shape can be recovered so that the first element 22 returns to an original length. That is, it is possible to load the first shape memory alloy such that an elastic strain limit of the first shape memory alloy is surpassed and deformation takes place in the martensitic crystal structure of the first shape memory alloy prior to exceeding a true plastic strain limit of the first shape memory alloy. Strain of this type, between the elastic strain limit and the true plastic strain limit, is pseudoplastic strain.

Therefore, the first element 22 formed from the first shape memory alloy may be stretched before installation in the heat engine 20 such that the nominal length of the first shape memory alloy includes the recoverable pseudoplastic strain.

Such recoverable pseudoplastic strain may provide motion for actuating and/or driving the heat engine 20. Therefore, without pre-stretching the first shape memory alloy, little deformation may occur during crystallographic phase change. Further, the first element 22 may be subjected to a tensile force provided by a biasing mechanism, e.g., a spring or a tensioned austenitic section of the first shape memory alloy, to effect crystallographic phase change.

Conversely, the first shape memory alloy may change crystallographic phase from austenite to martensite to thereby dimensionally expand at the localized region 24 in response the heat sink 14. For example, when the first shape memory alloy is subjected to a tensile stress and the second temperature, $T_2$, the first shape memory alloy may dimensionally expand. The first shape memory alloy may thereby convert thermal energy to mechanical energy by alternately expanding and contracting. That is, the first shape memory alloy may alternately dimensionally expand at the localized region 24 in response to the second temperature, $T_2$, and dimensionally contract at the localized region 24 in response to the first temperature, $T_1$, to thereby convert thermal energy to mechanical energy, as set forth in more detail below.

The first shape memory alloy may have any suitable composition. In particular, the first shape memory alloy may include in combination an element selected from the group of cobalt, nickel, titanium, indium, manganese, iron, palladium, zinc, copper, silver, gold, cadmium, tin, silicon, platinum, and gallium. For example, suitable first shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The first shape memory alloy can be binary, ternary, or any higher order so long as the first shape memory alloy exhibits a shape memory effect, e.g., a change in shape orientation, damping capacity, and the like. The first shape memory alloy may be selected according to desired operating temperatures of the exhaust system 10, as set forth in more detail below. In one specific example, the first shape memory alloy may include nickel and titanium.

Further, the first element 22 formed from the first shape memory alloy may have any suitable form, i.e., shape. For example, the first element 22 may have a form of a shape-changing element. That is, the first element 22 may have a form selected from the group of springs, tapes, wires, bands, continuous loops, and combinations thereof. Referring to FIG. 1, in one variation, the first element 22 may be configured as a continuous loop.

Figure 2:
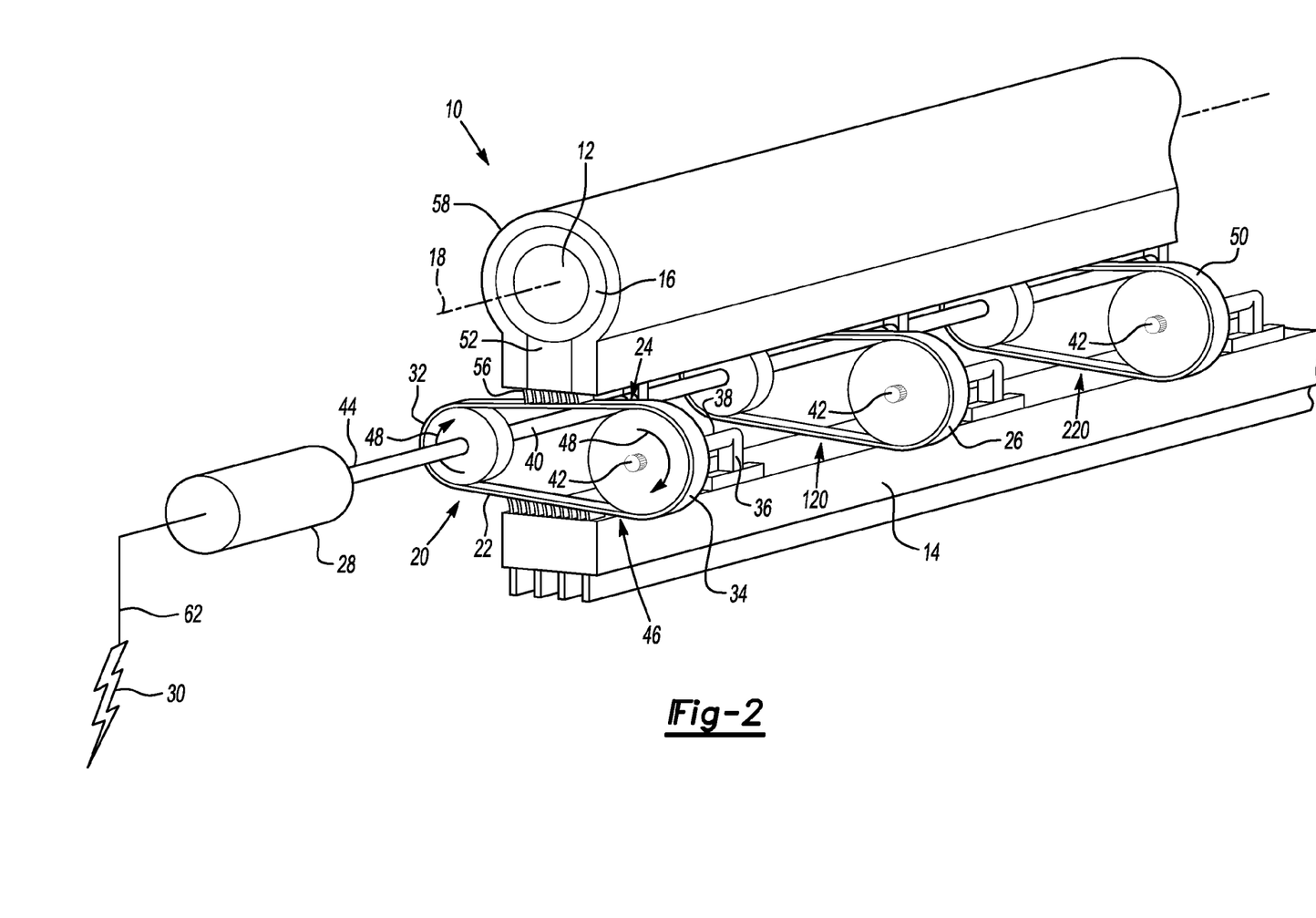
FIG. 2 is a schematic perspective view of another variation of the exhaust system of FIG. 1 including a plurality of heat engines.

Referring now to FIG. 2, in another variation, the exhaust system 10 may include at least a second element 26 formed from a second shape memory alloy having a crystallographic phase changeable between austenite and martensite at a second transformation temperature, $T_{trans2}$, in response to the temperature difference, $\Delta T$, between the exhaust gas 12 and the heat sink 14. That is, the exhaust system 10 may include a plurality of elements 22, 26 and the elements 22, 26 may be formed from the same or different shape memory alloys. The second element 26 may be selected so that the second transformation temperature, $T_{trans2}$, is lower than the first transformation temperature, $T_{trans1}$, of the first element 22. Therefore, the second shape memory alloy may change between austenite and martensite at a lower temperature, as set forth in more detail below.

For the variation including a plurality of elements 22, 26, each of the elements 22, 26 may have a different transformation temperature, $T_{trans}$, at which the crystallographic phase changes between austenite and martensite. That is, each element 22, 26 may change crystallographic phase at a different transformation temperature, $T_{trans}$, but may cooperate with other elements 22, 26, e.g., combine mechanical energy output, to produce a maximum amount of mechanical energy.

In another variation, the first element 22 may further have at least the second transformation temperature, $T_{trans2}$, along a thickness of the first element 22 at which the crystallographic phase changes between austenite and martensite. That is, the first element 22 may have a plurality of transformation temperatures, $T_{trans}$, along the thickness of the first element 22 at which the crystallographic phase changes between austenite and martensite. Therefore, one or more portions of the first element 22 may change crystallographic phase before another portion of the first element 22. In yet another variation, the first element 22 may include multiple, simultaneous crystallographic phase changes along the thickness of the first element 22.

In operation, as described with reference to FIGS. 1 and 2 and set forth in more detail below, the first shape memory alloy may change crystallographic phase between austenite and martensite when in thermal relationship with one of the exhaust gas 12 and the heat sink 14. For example, when in thermal relationship with the exhaust gas 12, the first shape memory alloy may change from martensite to austenite. Likewise, when in thermal relationship with the heat sink 14, the first shape memory alloy may change from austenite to martensite.

The first shape memory alloy may convert thermal energy to mechanical energy via any suitable manner. For example, the first element 22 formed from the first shape memory alloy may activate a pulley system (shown generally in FIGS. 1 and 2 and set forth in more detail below), engage a lever (not shown), rotate a flywheel (not shown), engage a screw (not shown), and the like.

Referring again to the heat engine 20 of FIG. 1, the heat engine 20 is disposed in thermal relationship, e.g., in heat exchange relationship, with the conduit 16. For example, as shown in FIG. 1, the heat engine 20 may be disposed adjacent the conduit 16 so that thermal energy may transfer from the conduit 16 to the heat engine 20.

Referring again to FIGS. 1 and 2, the exhaust system 10 may also include a generator 28. The generator 28 may be configured for converting mechanical energy to electricity (represented generally by symbol 30 in FIGS. 1 and 2). The generator 28 may be any suitable device for converting mechanical energy to electricity 30. For example, the generator 28 may be an electrical generator that converts mechanical energy to electricity 30 using electromagnetic induction, and may include a rotor (not shown) that rotates with respect to a stator (not shown). Therefore, thermal energy may be harvested and converted to mechanical energy and/or electricity 30 for re-use by the engine (not shown) and/or storage in a battery (not shown) of the vehicle (not shown).

Referring again to FIGS. 1 and 2, the generator 28 may be driven by the heat engine 20. That is, mechanical energy resulting from the conversion of thermal energy by the first element 22 may drive the generator 28. In particular, the aforementioned dimensional contraction and dimensional expansion of the first element 22 formed from the first shape memory alloy may drive the generator 28, as set forth in more detail below.

Referring again to FIG. 1, in one non-limiting example, the first element 22 may be configured in a continuous loop. In this example, the heat engine 20 may include a plurality of pulleys 32, 34 or wheels configured for supporting the first element 22. The heat engine 20 may also include a frame 36 configured for supporting the plurality of pulleys 32, 34 or wheels. For example, the plurality of pulleys 32, 34 or wheels may be disposed on a plurality of axles 38, 40, and may rotate with respect to the frame 36. The first element 22 formed from the first shape memory alloy may be supported by and travel along the wheels or pulleys 32, 34. That is, in this variation, the continuous loop may translate along the plurality of pulleys 32, 34.

With continued reference to FIG. 1, speed of rotation of the wheels or pulleys 32, 34 may optionally be modified by one or more gear sets 42. Moreover, the generator 28 may include a drive shaft 44 attached to the wheel or pulley 32. As the wheels or pulleys 32, 34 turn or rotate about the respective axles 38, 40 of the heat engine 20 in response to the dimensionally expanding and contracting first element 22 formed from the first shape memory alloy, the drive shaft 44 may rotate and drive the generator 28. That is, as described with reference to FIG. 1, the first shape memory alloy may alternately dimensionally expand at the other localized region 46 in response to the second temperature, $T_2$, and dimensionally contract at the localized region 24 in response to the first temperature, $T_1$, to thereby convert thermal energy to mechanical energy and drive the generator 28. The generator 28 may then generate electricity 30 so that mechanical energy is converted to electricity 30.

In another non-limiting example, although not shown, the exhaust system 10 may include the first element 22 in a straight-wire configuration. For example, in one variation, the heat engine 20 of the exhaust system 10 may be configured as a linear actuator for the generator 28. The linear actuator may be used to directly convert reciprocating motion of a conductor moving in a magnetic field. In this variation, the first element 22 may be configured as two straight wires connected to a permanent magnet (not shown). When the shape memory alloy is warmed, e.g., exposed to the first temperature, $T_1$, of the exhaust gas 12, the first element 22 dimensionally contracts. The contraction moves the permanent magnet and induces a voltage in windings (not shown) of the generator 28. Upon subsequent exposure to the heat sink 14, the first shape memory alloy cools, and the first element 22 dimensionally expands. The first element 22 then continues to dimensionally expand and contract as long as a temperature difference, $\Delta T$, exists between the exhaust gas 12 and the heat sink 14.

Additionally, the heat engine 20 may be configured to act as a flywheel so that during selected operating conditions, conversion of thermal energy to mechanical energy can be bypassed. During such operating conditions, any kinetic energy of the heat engine 20 may still be harvested without necessary thermal energy input. Therefore, in this variation, the first element 22 may be protected from damage when heat engine speed and heat transfer rates are not synchronized.

Further, although not shown, the heat engine 20 may also include cleaning components, e.g., brushes, configured for cleaning and/or scraping the first element 22 of the heat engine 20. For example, since the exhaust system 10 may be operated in harsh and/or dirty environments, the cleaning components may remove corrosion and built-up dirt so that the heat engine 20 operates efficiently. In addition, the heat engine 20 may also include other operational components such as permanent magnets, flaps, and springs, depending upon the desired application.

Referring again to FIG. 1, the heat engine 20 may also include a clutch (represented generally by arrows 48) configured for preventing operation of the heat engine 20 in a non-desired operational direction, e.g., counterclockwise or leftward. That is, the clutch 48 may include a ratcheting mechanism to allow the heat engine 20 to operate in only the desired operational direction. The clutch 48, therefore, may be characterized as "one-way" and may ensure that the heat engine 20 is not "back driven".

Referring now to FIG. 2, in one variation, the exhaust system 10 may include a plurality of heat engines 20, 120, 220. For example, the exhaust system 10 may include two or more heat engines 20, 120, 220. Further, multiple heat engines 20, 120, 220 may be arranged in series and/or parallel along a length of the conduit 16. For example, the plurality of heat engines 20, 120, 220 may be arranged in cascading sequence along the length of the conduit 16 so that relatively cooler gas, i.e., the heat sink 14, from a first heat engine 120 acts as the exhaust gas 12 for a second heat engine 20, so as to harvest maximum thermal energy from the exhaust gas 12.

In one configuration, multiple heat engines 20, 120, 220 may be arranged along the length of the conduit 16 so as to be individually tuned via design and shape memory alloy selection to optimally operate according to slight temperature variations along the length of the conduit 16. That is, the plurality of heat engines 20, 120, 220 may be arranged in a two-stage axial cascade configuration to exploit temperature differences along the axis 18 of the conduit 16. For example, one heat engine 20, i.e., a first stage, may be disposed downstream of a second heat engine 120, i.e., a second stage. More specifically, three heat engines 20, 120, 220 may be arranged at a first position having the first temperature, $T_1$, a second position having the second temperature, $T_2$, that is higher than the first temperature, $T_1$, and a third position having a third temperature, $T_3$, that is higher than each of the first temperature, $T_1$, and the second temperature, $T_2$. That is, the exhaust gas 12 may cool slightly from the third position to the first position. At each position, a gap between the conduit 16 and the respective heat engines 20, 120, 220 may vary to accommodate the relative temperature differences. For example, a gap at the third position may be larger than the gaps at each of the first and second positions. Alternatively or additionally, the three heat engines 20, 120, 220 may have three respective elements 22, 26, 50 formed from three respective shape memory alloys having a respective first, second, and third transformation temperature, $T_{trans1}$, $T_{trans2}$, $T_{trans3}$. Therefore, the plurality of heat engines 20, 120, 220 may be selected to change crystallographic phase at different transformation temperatures, $T_{trans}$, according to a position and temperature of the exhaust gas 12 and/or heat sink 14 along the axis 18 of the conduit 16.

In another configuration, although not shown, the plurality of heat engines 20, 120 may be arranged in a two-stage radial cascade configuration to exploit radial temperature differences, i.e., temperature differences due to radial spacing from the axis 18 of the conduit 16. For example, one heat engine 20, i.e., the first stage, may be disposed radially closer to the conduit 16 than a second heat engine 120, i.e., the second stage.

In both of the aforementioned non-limiting example configurations, the first stage and the second stage may be disposed in thermal relationship with one another, may cooperate, and/or may act independently. For example, the plurality of heat engines 20, 120, 220 may share one element 22.

Referring again to FIGS. 1 and 2, the exhaust system 10 also includes a member 52 disposed in contact with the conduit 16 and configured for conducting thermal energy from the conduit 16 to the heat engine 20. For example, the member 52 may transfer thermal energy to the heat engine 20 via conduction. That is, to optimize mechanical energy and/or electricity output of the heat engine 20, the amount of waste heat transferred to the heat engine 20 from the exhaust gas 12 must be maximized. Such optimization may be accomplished by minimizing heat lost through waste heat dissipation, e.g., to the heat sink 14, directing heat from the exhaust gas 12 to the heat engine 20, and/or optimizing a heat transfer rate from the exhaust gas 12 to the first element 22. The member 52, therefore, may enable such optimization.

More specifically, the member 52 may be formed from any conductive material suitable for transferring thermal energy from the exhaust gas 12 to the first element 22 of the heat engine 20. That is, the member 52 may be configured to transfer thermal energy from the conduit 16 to the heat engine 20 via conduction. For example, the member 52 may be formed from a metal having excellent thermal conductivity. As shown in FIG. 1, the member 52 is disposed in contact with the conduit 16 so as to transfer heat in the direction of arrows 54 between the conduit 16 and the first element 22.

Further, as shown in FIGS. 1 and 2, the member 52 may include a plurality of contacting objects 56 configured for contacting the first element 22 to thereby change the crystallographic phase between austenite and martensite. For example, the plurality of contacting objects 56 may be flexible bristles, may extend from the member 52, and may contact the conduit 16 so as to effect conduction between the exhaust gas 12, the first element 22, and/or the member 52 of the exhaust system 10. In another example, the plurality of contacting objects 56 may be rollers configured to interface with the first element 22. The member 52 may be disposed in heat transfer relationship with the conduit 16, and the plurality of contacting objects 56 may be disposed in heat transfer relationship with the first element 22. Although not shown, the plurality of contacting objects 60 may also extend from the first element 22. For example, the first element 22 may include a plurality of flexible bristles.

Referring to FIG. 1, it is to be appreciated that the heat engine 20 may be disposed in any configuration or arrangement within the exhaust system 10. That is, although not shown in FIGS. 1 and 2, the member 52 and/or the contacting objects 56 may be disposed in thermal relationship with a portion of the first element 22 wound across a wheel or pulley 32. Alternatively, as shown in FIGS. 1 and 2, the member 52 and/or the contacting objects 56 may be disposed in thermal relationship with a portion of the first element 22 spanning a distance between two wheels or pulleys 32, 34.

Referring again to FIG. 1, the exhaust system 10 may further include an insulator 58 disposed in contact with the conduit 16 and configured for thermally insulating the conduit 16 and the member 52. In one variation, as shown in FIG. 1, the insulator 58 may be disposed in contact with the member 52. That is, insulator 58 may at least partially surround the conduit 16 and/or the member 52 to minimize heat transfer to the atmosphere external to the conduit 16. The insulator 58 may be formed from any suitable insulating material that is capable of absorbing and/or storing waste heat from the conduit 16, such as, but not limited to, a ceramic.

With continued reference to FIG. 1, the exhaust system 10 may further include an apparatus 60 configured for adjusting the temperature difference, $\Delta T$, between the exhaust gas 12 and the heat sink 14. For example, the apparatus 60 may include air inlets, vanes, squirrel cage fans, centrifugal air pumps, and the like, for directing fluid flow across the first element 22 to thereby change a temperature of the first element 22. For example, the apparatus 60 may be oriented so that air external to the exhaust system 10 and/or relatively cooler exhaust gas 12 may flow across the first element 22 formed from the first shape memory alloy. As the apparatus 60 changes the temperature of the first element 22, the first element 22 may dimensionally expand and induce motion of the heat engine 20 in the desired operational direction. Therefore, heat flow 54 (FIG. 1) may be increased to one region, e.g., the localized region represented by arrow 24, as compared to another region, e.g., another localized region represented by arrow 46, by the vent flaps or vanes.

In operation, and described with general reference to FIGS. 1 and 2, the heat engine 20, and in particular, the first element 22 formed from the first shape memory alloy, may be disposed in thermal relationship with each of the exhaust gas 12 and the heat sink 14, as set forth above. That is, the first element 22 may be disposed relative to each of the exhaust gas 12 and the heat sink 14 so as to react to the first temperature, $T_1$, and/or the second temperature, $T_2$. For example, the first element 22 of the heat engine 20 may be disposed in contact with the plurality of contacting objects 56 of the member 52 so as to effect crystallographic phase change of the first shape memory alloy via conduction.

Therefore, the first shape memory alloy may change crystallographic phase between austenite and martensite when in thermal relationship with one of the exhaust gas 12 and the heat sink 14. For example, when in thermal relationship with the exhaust gas 12, the first shape memory alloy may change from martensite to austenite. Likewise, when in thermal relationship with the heat sink 14, the first shape memory alloy may change from austenite to martensite.

Further, the first shape memory alloy may change dimension upon changing crystallographic phase to thereby convert thermal energy to mechanical energy. More specifically, the first shape memory alloy may dimensionally contract upon changing crystallographic phase from martensite to austenite, e.g., if pseudoplastically pre-strained, and may dimensionally expand upon changing crystallographic phase from austenite to martensite to thereby convert thermal energy to mechanical energy. Therefore, for any condition wherein the temperature difference exists between the first temperature, $T_1$, of the exhaust gas 12 and the second temperature, $T_2$, of the heat sink 14, i.e., wherein the exhaust gas 12 and the heat sink 14 are not in thermal equilibrium, the first shape memory alloy may dimensionally expand and contract upon changing crystallographic phase between martensite and austenite. Further, the change in crystallographic phase of the first shape memory alloy may be sufficient to drive the generator 28.

With reference to the exhaust system 10 of FIG. 1, during start-up and continuous operation of the heat engine 20, the localized region 24 is in thermal relationship with, e.g., in contact with, the exhaust gas 12 while another localized region 46 is in thermal relationship with the heat sink 14 so as to effect crystallographic phase change of the first shape memory alloy. As the other localized region 46 of the first shape memory alloy dimensionally expands, e.g., dimensionally stretches when under stress, when in thermal relationship with the heat sink 14, the localized region (generally indicated by arrow 24) of the first shape memory alloy in thermal relationship with the exhaust gas 12 dimensionally contracts when previously pseudoplastically pre-strained. Alternating dimensional contraction and expansion of the continuous spring loop form of the first element 22 upon exposure to the temperature difference, $\Delta T$, between the exhaust gas 12 and the heat sink 14 may convert potential mechanical energy to kinetic mechanical energy, and thereby convert thermal energy to mechanical energy. Therefore, for optimal efficiency of the exhaust system 10, the exhaust gas 12 and the heat sink 14 are desirably rapidly refreshed to maintain the temperature difference, $\Delta T$, between the exhaust gas 12 and heat sink 14.

Referring again to FIG. 1, the heat engine 20 may be disposed in any location in the exhaust system 10 as long as portions of the first element 22 are disposed in thermal relationship with a respective exhaust gas 12 and heat sink 14 during operation so that the first shape memory alloy may change crystallographic phase in response to at least one of the exhaust gas 12, the heat sink 14, and the temperature difference, $\Delta T$, between the exhaust gas 12 and the heat sink 14. Also, although not shown, it is to be appreciated that the exhaust system 10 may include additional sensing and control components, e.g., an electronic control unit. The electronic control unit may be in operable communication with the exhaust system 10 and be configured for regulating conversion of thermal energy to mechanical energy and/or electricity 30. The electronic control unit may be, for example, a computer that electronically communicates with one or more controls and/or sensors of the exhaust system 10. For example, the electronic control unit may communicate with and/or control one or more of a temperature sensor of the exhaust gas 12, a temperature sensor of the heat sink 14, a speed regulator of the generator 28, fluid flow sensors, actuators, and meters configured for monitoring electricity generation.

Further, as shown in FIGS. 1 and 2, the exhaust system 10 may also include a transfer medium 62 configured for conveying electricity 30 from the exhaust system 10, e.g., from the generator 28. The transfer medium 62 may be, for example, a power line or an electrically-conductive cable. The transfer medium 62 may convey electricity 30 from the generator 28 to a storage device, e.g., a battery (not shown), an accumulator, and/or a collector. For example, the exhaust system 10 may generate, store, and/or convey electricity 30 according to fluctuations in demand.

It is also to be appreciated that for any of the aforementioned examples, variations, or configurations, the exhaust system 10 may include a plurality of heat engines 20, 120, 220 elements 22, 26, 50 and/or generators 28. That is, one exhaust system 10 may include more than one heat engine 20, 120, 220, element 22, 26, 50, and/or generator 28. For example, one heat engine 20 may drive more than one generator 28.

Figure 3:
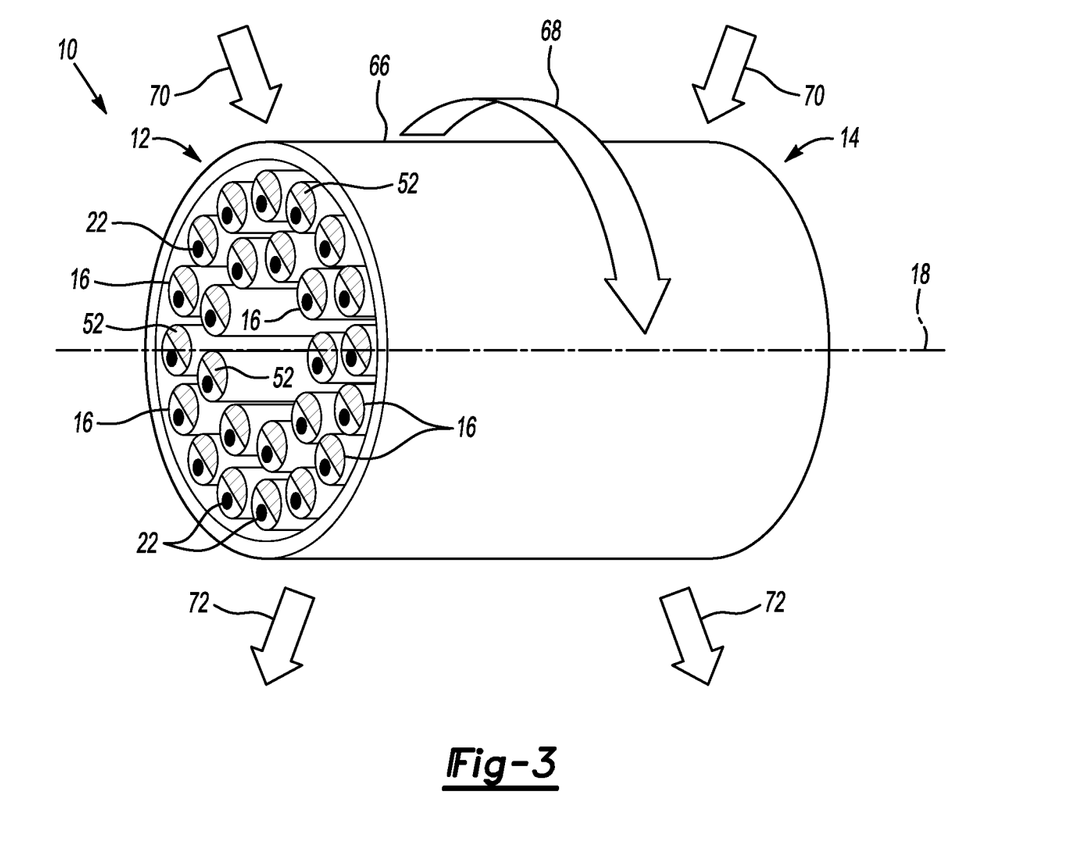
FIG. 3 is a schematic perspective view of yet another variation of the exhaust system of FIGS. 1 and 2 including a plurality of conduits and a plurality of heat engines.

Referring now to FIG. 3, in another variation, the exhaust system 10 includes a plurality of conduits 16 each configured for conveying the exhaust gas 12 along the axis 18. The conduits 16 may be arranged in any configuration suitable for a desired application. For example, as shown in FIG. 3, the plurality of conduits 16 may be radially disposed about, and spaced apart from, the axis 18.

Figure 4:
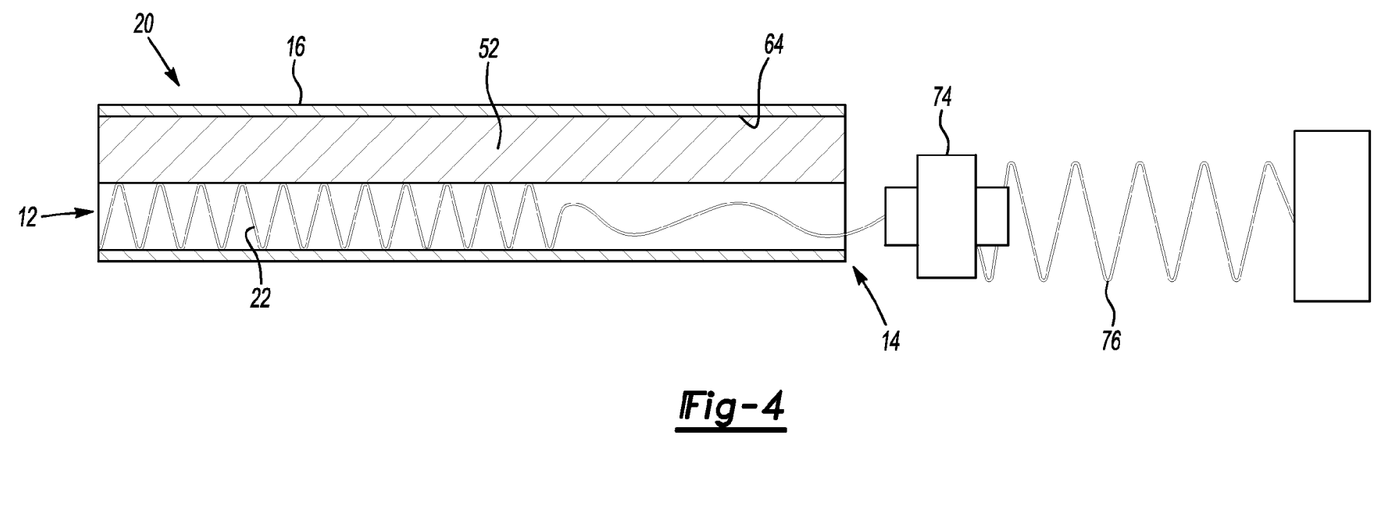
FIG. 4 is a schematic diagram of a cross-sectional view of a conduit of FIG. 3.

In this variation, the exhaust system 10 further includes a plurality of heat engines 20 (FIG. 4). Each of the plurality of heat engines 20 includes the first element 22 formed from the first shape memory alloy having the crystallographic phase changeable between austenite and martensite at the first transformation temperature, $T_{trans1}$, in response to the temperature difference, $\Delta T$, between the exhaust gas 12 and the heat sink 14. Further, as best shown in FIG. 3, each of the plurality of first elements 22 is disposed within a respective one of the plurality of conduits 16. Therefore, each of the plurality of first elements 22 may be disposed in thermal, e.g., heat exchange, relationship with a respective one of the plurality of conduits 16.

Referring again to FIG. 3, the exhaust system 10 of this variation also includes a plurality of members 52. Each of the plurality of members 52 is disposed in contact with a respective one of the plurality of conduits 16 and is configured for conducting thermal energy from the respective conduit 16 to the respective heat engine 20. For example, each of the plurality of members 52 may be disposed within a respective one of the plurality of conduits 16. Therefore, the exhaust system 10 may include an equal number of conduits 16, first elements 22, and members 52. As shown in FIG. 4, each of the plurality of members 52 may line a portion of an interior surface 64 of each conduit 16 so that the member 52 may conduct thermal energy from the conduit 16 to the heat engine 20, e.g., the first element 22 of the heat engine 20. In operation, as each conduit 16 fills with the exhaust gas 12, thermal energy carried by the exhaust gas 12 may be conducted via the member 52 from the conduit 16 to the first element 22 so that the first shape memory alloy may change crystallographic phase between austenite and martensite.

Referring to FIG. 3, the exhaust system 10 may also include a housing 66 centered on and rotatable with respect to the axis 18. The housing 66 may be formed from any suitable material, such as metal or plastic, and may rotate about the axis 18 during operation of the exhaust system 10, e.g., in the direction of arrow 68. In addition, each of the plurality of conduits 16 may be disposed within the housing 66. That is, the housing 66 may surround the plurality of conduits 16. Further, each of the plurality of conduits 16 may be disposed in fluid communication with each of the exhaust gas 12 and the heat sink 14 within the housing 66. That is, the housing 66 may surround a length of each conduit 16, and allow the conduits 16 to fill and empty with the exhaust gas 12 and the heat sink 14.

For this variation, the first shape memory alloy may alternately dimensionally expand at the localized region 24 in response to the second temperature, $T_2$, and dimensionally contract at the localized region 24 in response to the first temperature, $T_1$, to thereby convert thermal energy to mechanical energy.

Therefore, the exhaust system 10 may operate as a comprex-charger. In operation, as described with reference to FIGS. 3 and 4, as the housing 66 rotates in the direction of arrow 68 in FIG. 3, the plurality of conduits 16 each fill (in a direction indicated by arrows 70 in FIG. 3) and empty (in a direction indicated by arrows 72 in FIG. 3) with the exhaust gas 12 and the heat sink 14, e.g., intake air. During each rotation of the housing 66, a rapid pulsation and expansion/compression of the exhaust gas 12 and the intake air occurs so that the intake air is supercharged.

Referring now to FIG. 4, the first element 22 may be disposed within each conduit 16 and connected to a torque ring 74, which in turn may be connected to a bias member 76, e.g., a spring, configured for elongating the first element 22. In operation, as the first element 22 is exposed to the exhaust gas 12 and the heat sink 14, the first element 22 alternately dimensionally contracts and expands, as set forth above. The torque ring 74 may be configured as an angled bearing that translates the contraction of the first element 22 into rotation of the comprex-charger. Further, the comprex-charger may include a concentric generator (not shown) to thereby generate electricity 30 (FIG. 1).

Therefore, during operation of the exhaust system 10 and described with reference to FIGS. 3 and 4, the first element 22 may change crystallographic phase between austenite and martensite when in thermal relationship with one of the exhaust gas 12 and the heat sink 14. For example, when in thermal relationship with the exhaust gas 12, the first element 22 may change from martensite to austenite. Likewise, when in thermal relationship with the heat sink 14, the first shape memory alloy may change from austenite to martensite.

More specifically, the first element 22 may change dimension upon changing crystallographic phase to thereby convert thermal energy to mechanical energy. More specifically, the first element 22 may dimensionally contract upon changing crystallographic phase from martensite, e.g., if pseudoplastically pre-strained, to austenite and may dimensionally expand upon changing crystallographic phase from austenite to martensite to thereby convert thermal energy to mechanical energy. Therefore, for any condition wherein the temperature difference exists between the first temperature, $T_1$, of the exhaust gas 12 and the second temperature, $T_2$, of the heat sink 14, i.e., wherein the exhaust gas 12 and the heat sink 14 are not in thermal equilibrium, the first element 22 formed from the first shape memory alloy may dimensionally expand and contract upon changing crystallographic phase between martensite and austenite to thereby convert thermal energy stored and carried by the exhaust gas 12 to mechanical energy. The change in crystallographic phase of the shape memory alloy is also sufficient to drive the generator 28.

While the best modes for carrying out the disclosure have been described in detail, those familiar with the art to which the disclosure relates will recognize various alternative designs and embodiments for practicing the disclosure within the scope of the appended claims.

The invention claimed is:

1. An exhaust system configured for converting thermal energy to mechanical energy, the exhaust system comprising:
    a source of thermal energy provided by a temperature difference between an exhaust gas having a first temperature and a heat sink having a second temperature that is lower than said first temperature;
    a conduit configured for conveying said exhaust gas;
    a heat engine disposed in thermal relationship with said conduit and configured for converting thermal energy to mechanical energy, wherein said heat engine includes a first element formed from a first shape memory alloy having a crystallographic phase changeable between austenite and martensite at a first transformation temperature in response to said temperature difference between said exhaust gas and said heat sink; and
    a member formed from a conductive material and disposed in contact with said conduit so that said member abuts said conduit and transfers thermal energy from said conduit to said first element via conduction;
    wherein said member includes a plurality of bristles each extending from and flexible with respect to said member and disposed in contact with said first element.

2. The exhaust system of claim 1, wherein said first shape memory alloy changes crystallographic phase from martensite to austenite to thereby dimensionally contract at a localized region in response to said exhaust gas.

3. The exhaust system of claim 2, wherein said first shape memory alloy changes crystallographic phase from austenite to martensite to thereby dimensionally expand at said localized region in response to said heat sink.

4. The exhaust system of claim 3, wherein said first shape memory alloy alternately dimensionally expands at said localized region in response to said second temperature and dimensionally contracts at said localized region in response to said first temperature to thereby convert thermal energy to mechanical energy.

5. The exhaust system of claim 1, further including an insulator disposed in contact with said conduit and configured for thermally insulating said conduit and said member.

6. The exhaust system of claim 5, wherein said insulator is disposed in contact with said member.

7. The exhaust system of claim 1, further including a plurality of heat engines.

8. The exhaust system of claim 1, further including at least a second element formed from a second shape memory alloy having a crystallographic phase changeable between austenite and martensite at a second transformation temperature in response to said temperature difference between said exhaust gas and said heat sink.

9. The exhaust system of claim 1, wherein said first element further has at least a second transformation temperature along a thickness of said first element at which said crystallographic phase changes between austenite and martensite.

10. The exhaust system of claim 1, further including an apparatus configured for adjusting said temperature difference between said exhaust gas and said heat sink.

11. The exhaust system of claim 1, further including a generator configured for converting mechanical energy to electricity, wherein said generator is driven by said heat engine.

12. The exhaust system of claim 11, wherein said first shape memory alloy alternately dimensionally expands at a localized region in response to said second temperature and dimensionally contracts at another localized region in response to said first temperature to thereby convert thermal energy to mechanical energy and drive said generator.

13. An exhaust system configured for converting thermal energy to mechanical energy, the exhaust system comprising:
    a source of thermal energy provided by a temperature difference between an exhaust gas having a first temperature and a heat sink having a second temperature that is lower than said first temperature;
    a conduit configured for conveying said exhaust gas;
    a heat engine disposed in thermal relationship with said conduit and configured for converting thermal energy to mechanical energy, wherein said heat engine includes a first element formed from a first shape memory alloy having a crystallographic phase changeable between austenite and martensite at a first transformation temperature in response to said temperature difference between said exhaust gas and said heat sink;
    a member formed from a conductive material and disposed in contact with said conduit so that said member abuts said conduit and transfers thermal energy from said conduit to said first element via conduction, wherein said member includes a plurality of bristles each extending from and flexible with respect to said member and disposed in contact with said first element to thereby change said crystallographic phase between austenite and martensite;
    an insulator disposed in contact with said conduit and said member and configured for thermally insulating said conduit and said member; and
    a generator configured for converting mechanical energy to electricity, wherein said first shape memory alloy alternately dimensionally expands at a localized region in response to said second temperature and dimensionally contracts at another localized region in response to said first temperature to thereby convert thermal energy to mechanical energy and drive said generator.

14. An exhaust system configured for converting thermal energy to mechanical energy, the exhaust system comprising:
    a source of thermal energy provided by a temperature difference between an exhaust gas having a first temperature and a heat sink having a second temperature that is lower than the first temperature;
    a plurality of conduits each configured for conveying said exhaust gas along an axis, wherein each of said plurality of conduits has an interior surface and is radially disposed about and spaced apart from said axis;
a housing centered on and rotatable with respect to said axis, wherein each of said plurality of conduits is disposed within said housing and in fluid communication with said exhaust gas and said heat sink;
a torque ring;
a plurality of first elements each connected to said torque ring and formed from a first shape memory alloy having a crystallographic phase changeable between austenite and martensite at a first transformation temperature in response to said temperature difference between said exhaust gas and said heat sink;
a plurality of heat engines;
wherein each of said plurality of heat engines includes a respective one of said plurality of first elements disposed within a respective one of said plurality of conduits; and
a plurality of members each formed from a conductive material;
wherein each of said plurality of members is disposed in contact with said interior surface of a respective one of said plurality of conduits so that each of said plurality of members abuts said respective one of said plurality of conduits and transfers thermal energy from said respective one of said plurality of conduits to said respective one of said plurality of first elements via conduction;
wherein said first shape memory alloy alternately dimensionally expands at a localized region in response to said second temperature and dimensionally contracts at said localized region in response to said first temperature so that said torque ring rotates said housing and thereby converts thermal energy to mechanical energy.

* * * * *